US008085446B2

(12) United States Patent
Harada

(10) Patent No.: US 8,085,446 B2
(45) Date of Patent: Dec. 27, 2011

(54) IMAGE PROCESSING DEVICE FOR CREATING DATA FILE FROM MONOCHROME IMAGE AFTER THE MONOCHROME IMAGE HAS BEEN COMPRESSED BY DIFFERENT COMPRESSION METHODS

(75) Inventor: Hiroyuki Harada, Osaka (JP)

(73) Assignee: Kyocera Mita Corporation (JP)

( * ) Notice: Subject to any disclaimer, the term of this patent is extended or adjusted under 35 U.S.C. 154(b) by 454 days.

(21) Appl. No.: 12/334,923

(22) Filed: Dec. 15, 2008

(65) Prior Publication Data

US 2009/0161170 A1 Jun. 25, 2009

(30) Foreign Application Priority Data

Dec. 25, 2007 (JP) ................................ 2007-333137

(51) Int. Cl.
*H04N 1/00* (2006.01)
(52) U.S. Cl. ............... 358/426.06; 358/426.05; 358/1.9; 358/1.13; 358/1.15; 358/448; 382/166; 382/232; 382/234; 382/235; 382/239
(58) Field of Classification Search .................. None
See application file for complete search history.

(56) References Cited

U.S. PATENT DOCUMENTS

| | | | | |
|---|---|---|---|---|
| 5,363,219 A * | 11/1994 | Yoshida | ........................ | 358/539 |
| 6,195,462 B1 * | 2/2001 | Bryniarski et al. | ........... | 382/239 |
| 6,992,686 B2 * | 1/2006 | Nagarajan | ..................... | 345/660 |
| 6,993,194 B2 * | 1/2006 | Nakamura | ..................... | 382/232 |
| 7,133,565 B2 * | 11/2006 | Toda et al. | ..................... | 382/243 |
| 7,403,298 B2 * | 7/2008 | Tanaka | ........................ | 358/1.13 |
| 7,466,456 B2 * | 12/2008 | Kanno | ..................... | 358/426.06 |
| 7,477,796 B2 * | 1/2009 | Sasaki et al. | .................. | 382/248 |
| 7,856,149 B2 * | 12/2010 | Govindaswamy et al. | ... | 382/239 |
| 7,894,679 B2 * | 2/2011 | Nagarajan et al. | ............ | 382/232 |
| 7,912,300 B2 * | 3/2011 | Matsumoto | .................... | 382/232 |
| 2001/0052991 A1 * | 12/2001 | Oomori | ......................... | 358/1.9 |
| 2002/0051236 A1 * | 5/2002 | Nakamura | ..................... | 358/467 |
| 2002/0080415 A1 * | 6/2002 | Akimoto et al. | ............. | 358/402 |
| 2004/0036901 A1 * | 2/2004 | Nakane | ......................... | 358/1.13 |
| 2004/0114199 A1 * | 6/2004 | Kanno | ......................... | 358/474 |
| 2005/0024666 A1 * | 2/2005 | Ohyama et al. | ............. | 358/1.13 |
| 2005/0275666 A1 * | 12/2005 | Nagarajan | ..................... | 345/660 |
| 2005/0280857 A1 * | 12/2005 | Sugiyama et al. | ........... | 358/1.13 |

(Continued)

FOREIGN PATENT DOCUMENTS

JP 05063998 A * 3/1993

(Continued)

*Primary Examiner* — King Poon
*Assistant Examiner* — Dung Tran
(74) *Attorney, Agent, or Firm* — Gerald E. Hespos; Michael J. Porco

(57) ABSTRACT

An image processing device includes a first encoding processing portion to perform first encoding processing according to a first compression method for compressing multilevel image data and a second encoding processing portion to perform second encoding processing according to a second compression method for compressing binary image data. A determination portion determines whether an image made up of acquired image data is a monochrome image. A data volume estimating portion makes an estimation between a first data volume when image data forming the monochrome image is compressed by the first encoding processing and a second data volume when the image data is compressed by the second encoding processing as to which data volume becomes smaller. A file creating portion creates a data file from image data that has the smaller volume.

13 Claims, 8 Drawing Sheets

U.S. PATENT DOCUMENTS

| | | | |
|---|---|---|---|
| 2006/0132855 A1* | 6/2006 | Dokuni et al. | 358/448 |
| 2007/0025627 A1* | 2/2007 | Hasegawa et al. | 382/239 |
| 2007/0070463 A1 | 3/2007 | Moro | |
| 2007/0242297 A1* | 10/2007 | Eki | 358/1.9 |
| 2008/0037882 A1* | 2/2008 | Tamura et al. | 382/232 |
| 2008/0088868 A1* | 4/2008 | Endo | 358/1.13 |
| 2008/0244158 A1* | 10/2008 | Funatsu et al. | 711/100 |
| 2008/0253647 A1* | 10/2008 | Cho et al. | 382/164 |
| 2009/0073516 A1* | 3/2009 | Tanaka | 358/505 |
| 2009/0161970 A1* | 6/2009 | Harada | 382/232 |

FOREIGN PATENT DOCUMENTS

| | | |
|---|---|---|
| JP | 11-155045 | 6/1999 |
| JP | 2007-97169 | 4/2007 |

* cited by examiner

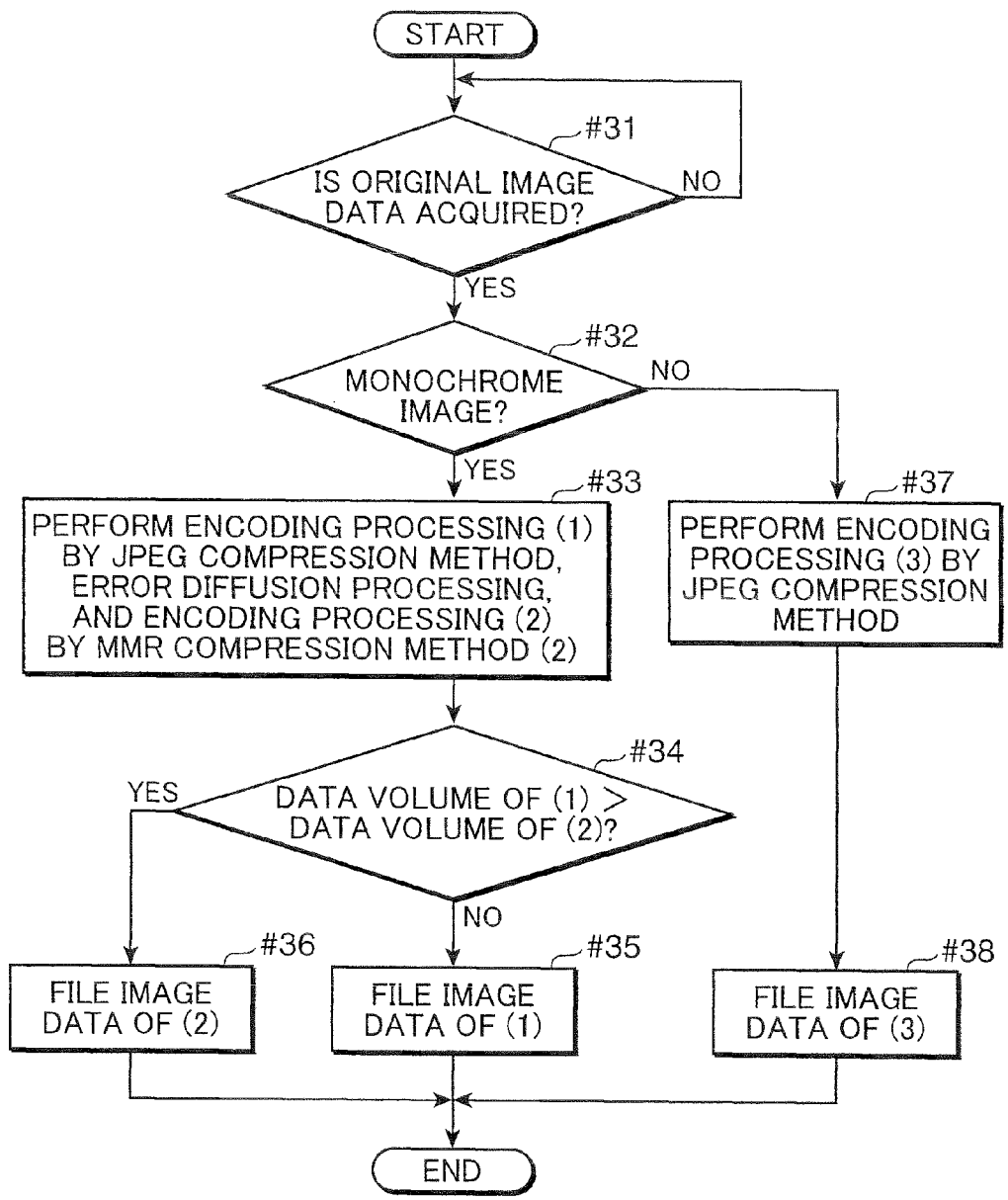

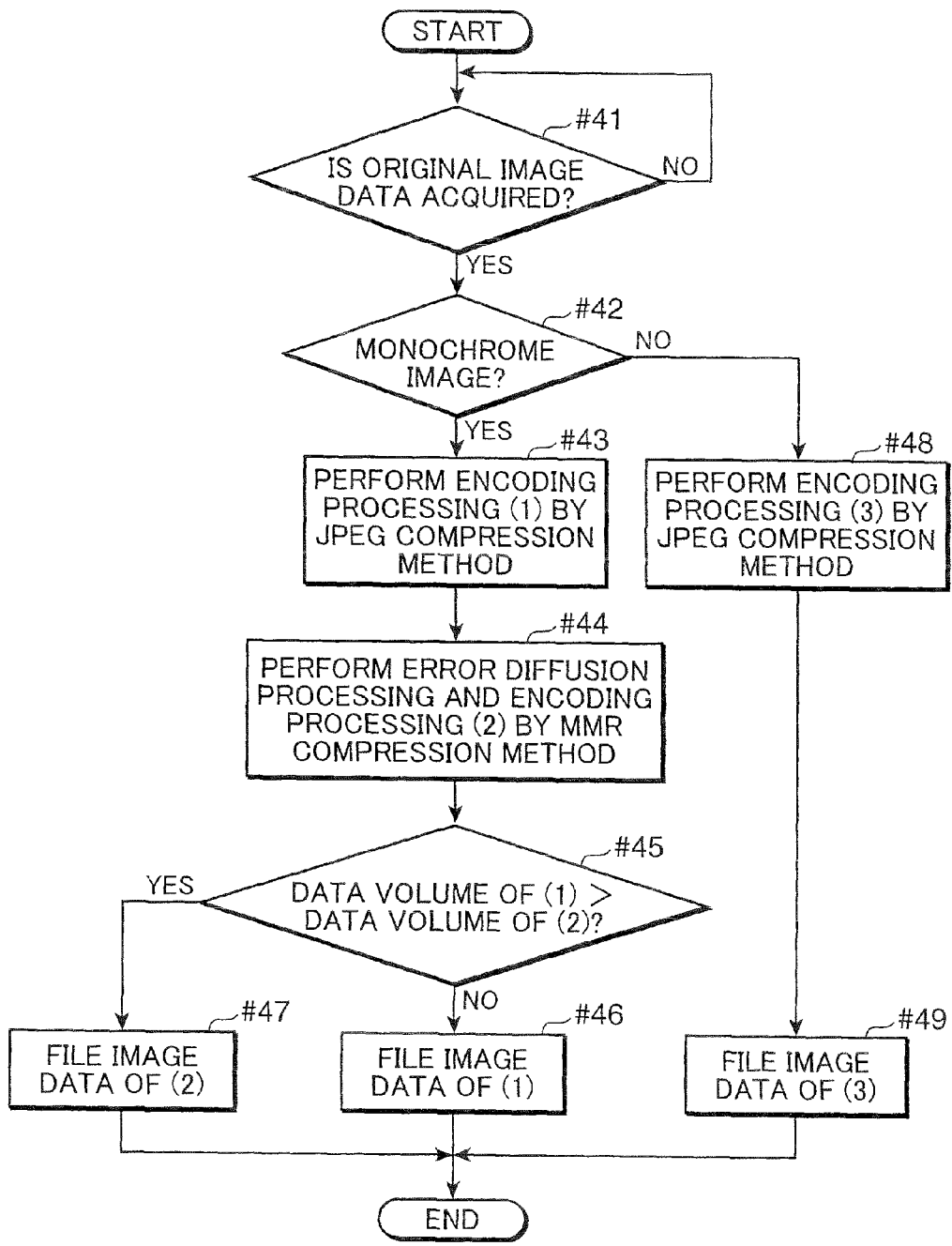

IMAGE PROCESSING DEVICE FOR CREATING DATA FILE FROM MONOCHROME IMAGE AFTER THE MONOCHROME IMAGE HAS BEEN COMPRESSED BY DIFFERENT COMPRESSION METHODS

BACKGROUND OF THE INVENTION

1. Field of the Invention

The present invention relates to an image processing device capable of performing encoding processing according to a compression method for compressing multilevel image data and encoding processing according to a compression method for compressing binary image data, and to an image reading device equipped with the image processing device.

2. Description of the Related Art

There is a color digital copying machine furnished with a technique of automatically determining whether an image read by the image reading portion is a monochrome (black and white) image or a color image by the ACS (Auto Color Selection) processing (for example, JP-A-11-155045). Further, there is a copying machine furnished with a capability of enabling the user to select whether the encoding processing by the MMR (Modified Modified Read) (ITU-T T.6) compression method for compressing binary image data or the encoding processing by the JPEG (Joint Photographic Experts Group) compression method for compressing multilevel image data is to be performed when the image is determined as being a monochrome image from the result of the ACS processing in a case where the copying machine transmits the image data to an external device (for example, a personal computer, hereinafter abbreviated as PC), and this copying machine is now available in the market.

Meanwhile, when red and black are the colors of a two-color document, the document is not determined as being a two-color document by the ACS processing. This poses a problem that although the document is a two-color document, processing in the ACS mode is performed in the same manner as in the full-color mode. In order to solve this problem, JP-A-2007-97169 discloses a technique to determine whether a document is a full color document, a black document, or a two-color document on the basis of color information of the image data using histogram information and color difference level information, so that image processing is performed according to the determination result.

Incidentally, the copying machine furnished with the capability of enabling the user to select the type of encoding processing in a case where the image is a monochrome image has a problem as follows.

That is, the encoding processing according to the MMR compression method is normally selected to make a volume (size) of a file of the image data smaller than in a case where the image data is compressed by the JPEG compression method. However, in a case where the encoding processing by the MMR compression method is selected for image data in which image data forming a halftone image is present in large parts, the file size after the compression becomes larger than in a case where the image data is compressed by the encoding processing by the JPEG compression method in some cases, and under certain circumstances, the file size becomes larger than the size of a file when the original image data is filed intact.

For example, in a case where a sheet of the document is coarse paper, the sheet is colored as a whole. Moreover, the color distribution across the sheet per se is not uniform and there is a minute change. In a case where a reading operation is performed for a document of such a sheet, the image data obtained from the background other than the image is not constant. In a case where a sheet of the document is so-called normal paper, the image data obtained from the background other than the image is constant. The image data can be therefore compressed at a high compression ratio. On the contrary, in a case where a sheet of the document is coarse paper as described above, image data is compressed only at an extremely low compression ratio because the obtained image data is not constant. Further, because the image data is not constant, there arises a need to generate data as the data that should be generated separately. The file size therefore becomes larger than the size of a file when the original image data is filed intact.

A compression method called the high-compression PDF is adoptable instead of the MMR compression method. In this case, however, because images other than characters and ruled lines are compressed by the JPEG compression method by the high-compression PDF, there is a possibility that a file size is increased. Also, in a case where the high-compression PDF is adopted as the compression method, additional hardware or software may be required. In addition, in a case where software is added, the processing time may possibly be extended because of the added software.

Further, it may be possible to reduce a data volume to be transmitted to a network by configuring in such a manner that the encoding processing is performed by the JPEG compression method first and thence the image data after the encoding processing is transmitted to the PC, so that the file format for the image data after the encoding processing is converted in the PC (converted to binary image data). In this case, however, data having a relatively high frequency component, such as character information, may be lost when the file format is converted in the PC, which possibly deteriorates the image quality. It is therefore preferable that an image suitable to the MMR compression method is compressed by the MMR compression method and saved to a data file.

SUMMARY OF THE INVENTION

The invention was devised to solve the problems discussed above and has an object to provide an image processing device and an image reading device capable of making the size of a data file after compression smaller independently of the content of an image when an image subject to compression processing is a monochrome image.

An image processing device according to an aspect of the invention includes: a first encoding processing portion configured to perform first encoding processing according to a first compression method for compressing multilevel image data; a second encoding processing portion configured to perform second encoding processing according to a second compression method for compressing binary image data; a determination portion configured to determine whether an image made up of acquired image data is a monochrome image; a data volume estimating portion configured to make an estimation, in a case where the determination portion determines the image as being the monochrome image, between a first data volume as a data volume when image data forming the monochrome image is compressed by the first encoding processing and a second data volume as a data volume when the image data is compressed by the second encoding processing as to which data volume becomes smaller; and a file creating portion configured to create a data file from image data of the monochrome image after the first encoding processing by the first encoding processing portion when the data volume estimating portion makes an estimation that the first data volume is smaller than the second data volume and creates a data file from image data of the monochrome image after the second encoding processing by the second encoding processing portion when the data volume estimating portion makes an estimation that the second data volume is smaller than the first data volume.

In a case where the encoding processing is performed on image data forming a monochrome image, the second encoding processing for compressing binary image data indicating the density of an image by two values is basically more suitable than the first encoding processing for compressing multilevel image data indicating the density of an image by multiple values. However, for example, when halftones are included in large parts, a data volume may become larger by compressing a binary image by the second encoding processing than by the first encoding processing in some cases. Nevertheless, even in such a case, according to the configuration above, when it is estimated that a data volume of the image data after the first encoding processing is smaller than a data volume of the image data after the second encoding processing, a data file is created from the image data after the first encoding processing. It thus becomes possible to make a volume of a file (file size) of the monochrome image smaller than in a case where a data file is created from the image data after the second encoding processing.

Meanwhile, in a case where it is estimated that a data volume of the image data after the second encoding processing is smaller than a data volume of the image data after the first encoding processing, the second encoding processing is adopted, which is suitable as the encoding processing when encoding processing is performed on image data forming a monochrome image.

Consequently, in a case where an image subject to compression processing is a monochrome image, it becomes possible to make a size of a data file (volume of the file) after compression smaller independently of the content of an image.

Also, an image reading device according to another aspect of the invention includes an image reading portion configured to read an image of a document and the image processing device as described above. The image processing device acquires image data obtained by a reading operation of the image reading portion as the image data.

According to this configuration, in a case where an image of a document read by the image reading portion is a monochrome image, it becomes possible to reduce the size of a data file after compression smaller independently of the content of an image.

BRIEF DESCRIPTION OF THE DRAWINGS

FIG. 7 is a view showing a flowchart of image processing by the control portion in another modification; and FIG. 8 is a view showing a flowchart of image processing by the control portion in still another modification.

DETAILED DESCRIPTION OF THE PREFERRED EMBODIMENTS

Figure 1:
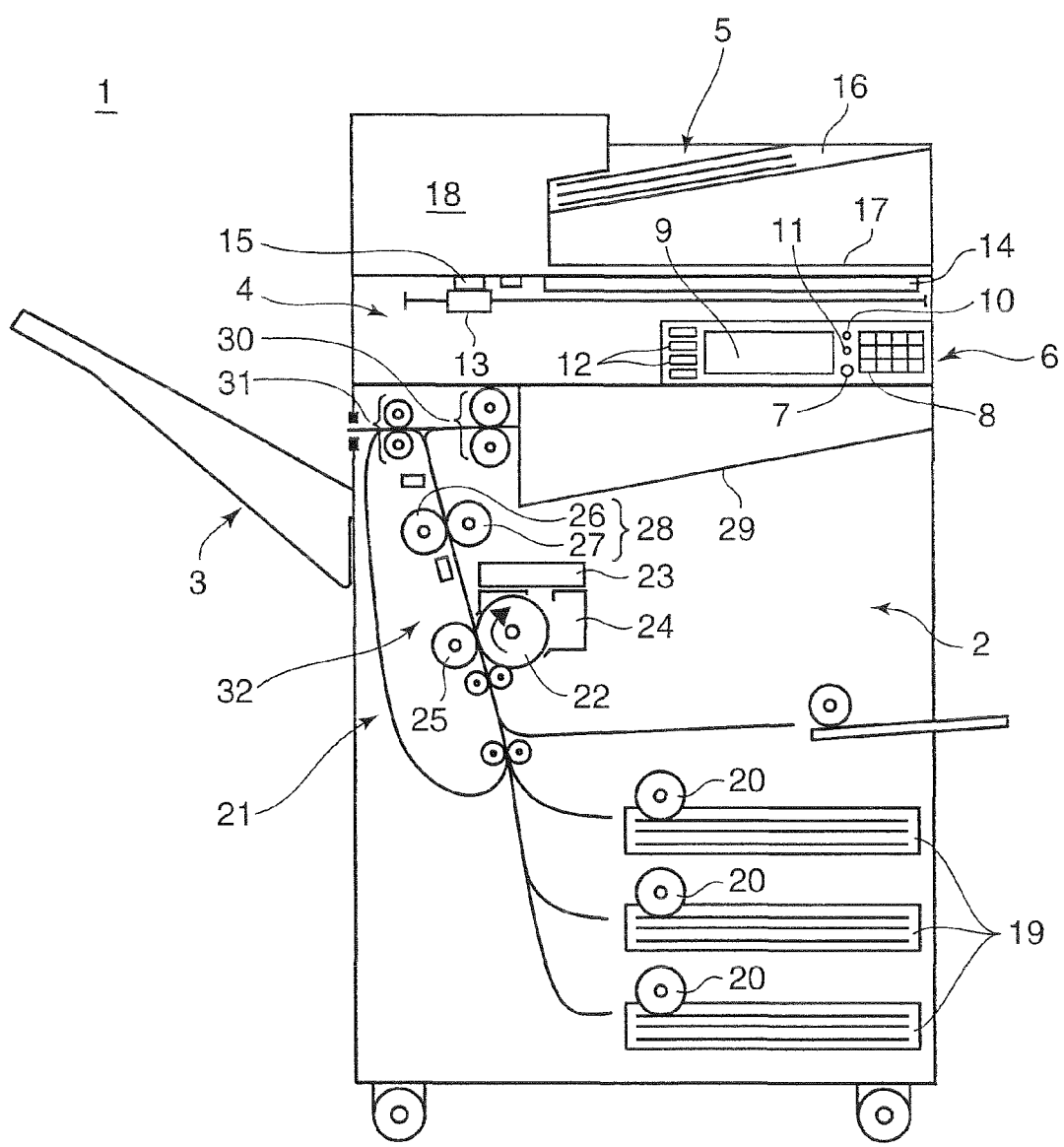
FIG. 1 is a side view schematically showing the inner configuration of a complex machine as an example of an image forming device according to one embodiment of the invention.

Hereinafter, a complex machine, which is an example of an image forming device of the invention, will be described with reference to the drawings as a first embodiment. FIG. 1 is a side view schematically showing the inner structure of the complex machine. A complex machine 1 is furnished with capabilities of functioning as a copying machine, a printer, a scanner, a facsimile machine, and so forth. The complex machine 1 includes a main body portion 2, a stack tray 3 provided on the left side of the main body portion 2, a document reading portion 4 provided on the top of the main body portion 2, and a document feeding portion 5 provided above the document reading portion 4.

An operation portion 6 is provided at the front of the complex machine 1. The operation portion 6 includes a start key 7 for enabling the user to input a print execute command, a numerical keypad 8 used to input the number of print copies, a display portion 9 formed of a liquid crystal display or the like to display operation guide information about various copying operations and furnished with a capability of functioning as a touch panel used to input various settings, a reset key 10 to reset the content of the setting made on the display portion 9, a stop key 11 to stop a print (image forming) operation being executed, a function switching key 12 to switch the complex machine 1 to function as a copying machine, a printer, a scanner, or a facsimile machine.

Figure 2:
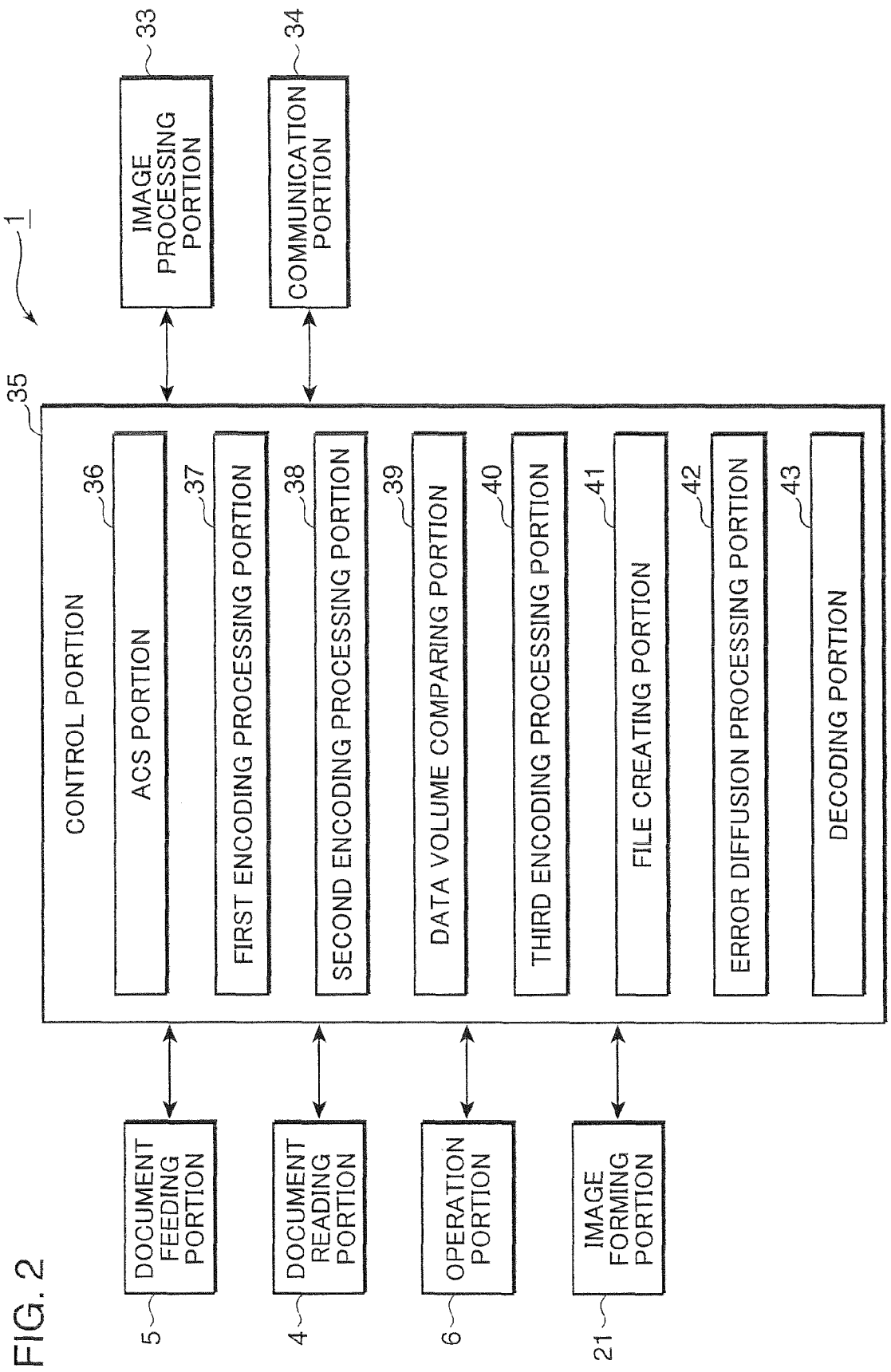
FIG. 2 is a block diagram showing the electrical configuration of the complex machine.

The document reading portion 4 includes a scanner portion 13 formed of a CCD (Charge Coupled Device) sensor, an exposure lamp, and the like, a document table 14 formed of a transparent member, such as glass, and a document reading slit 15. The scanner portion 13 is formed to be movable by an unillustrated drive portion. When reading a document placed on the document table 14, the scanner portion 13 is moved along the document surface at a position opposing the document table 14 to scan the document image, and outputs the image data thus obtained to a control portion 35 (FIG. 2). When reading a document fed from the document feeding portion 5, the scanner portion 13 is moved to a position opposing the document reading slit 15 and obtains the document image in synchronization with a transportation operation of the document by the document feeding portion 5 via the document reading slit 15, and outputs the image data to the control portion 35.

The document feeding portion 5 includes a document placement portion 16 on which to place a document, a document discharge portion 17 on which to discharge a document after the image has been read, and a document transportation mechanism 18 formed of a paper feeding roller and a transportation roller (neither is shown) to pick up the documents placed on the document placement portion 16 one by one so as to transport the document to the position opposing the document reading slit 15 and to discharge the document to the document discharge portion 17. The document transportation mechanism 18 further includes a document inversion mechanism (not shown) to reverse the document and transport the inverted document again to the position opposing the document reading slit 15. It is therefore possible to read the images on the both sides of the document by the scanner portion 13 via the document reading slit 15.

The document feeding portion 5 is provided to be rotatable with respect to the main body portion 2 so that the front face side is allowed to move upward. By opening the top face of the document table 14 by moving the front face side of the document feeding portion 5 upward, the operator becomes able to place a document to be read, for example, a two-page spread book, on the top face of the document table 14.

The main body portion 2 includes a plurality of paper feeding cassettes 19, paper feeding rollers 20 to pick up recording sheets from the corresponding paper feeding cassettes 19 one by one so as to transport the recording sheet to an image forming portion 21, and the image forming portion 21 that forms an image on the recording sheet transported from any one of the paper feeding cassettes 19.

The image forming portion 21 includes an optical unit 23 that exposes a photoconductive drum 22 to light by outputting a laser beam or the like according to the image data obtained in the scanner portion 13, a developing portion 24 that forms a toner image on the photoconductive drum 22, a transfer portion 25 that transfers the toner image on the photoconductive drum 22 onto a recording sheet, a fixing device 28 formed of a pair of rollers 26 and 27 that heats the recording sheet bearing the toner image to fix the toner image on the recording sheet, transportation roller pairs 30 and 31 that are provided in a sheet transportation path inside the image forming portion 21 to transport the recording sheet to a stack tray 3 or a discharge tray 29.

In a case where images are to be formed on the both sides of a recording sheet, after the image is formed on one side of the recording sheet in the image forming portion 21, the recording sheet is nipped by the transportation roller pair 30 on the discharge tray 29 side. The transportation roller pair 30 is rotated backward in this state so that the recording sheet is switched back. The recording sheet is then sent to a sheet transportation path 32 and transported again upstream of the image forming portion 21. After the image is formed on the other side in the image forming portion 21, the recording sheet is discharged to the stack tray 3 or the discharge tray 29.

FIG. 2 is a block diagram showing the electrical configuration of the complex machine 1. Like components are labeled with like reference numerals with respect to FIG. 1 and detailed descriptions of such components are omitted. The complex machine 1 is formed by including a document reading portion 4, a document feeding portion 5, an operation portion 6, an image forming portion 21, an image processing portion 33, a communication portion 34, and a control portion 35. The document reading portion 4, the document feeding portion 5, the operation portion 6, and the image forming portion 21 correspond to the counterparts shown in FIG. 1.

The image processing portion 33 performs various types of image processing on the image data. For example, the image processing portion 33 performs image processing including corrections, such as the level correction and the gamma correction, compression and decompression of image data, and scaling up and down of image data on the image data obtained by the image reading portion 4 or the image data transferred through the communication portion 34 from a personal computer connected via a network, a facsimile machine connected via a public line, or the like.

The communication portion 34 enables various types of data transmission and reception with an external device, such as a computer and a facsimile machine, connected via a network using a network interface. The communication portion 34 transmits a data file created by a file creating portion 41 described below, that is, compressed image data, to the external device connected via a network. In this case, because the traffic in the network increases as the size of the data file becomes larger, it is more preferable that the size of a data file becomes smaller.

The control portion 35 is responsible for the control on the overall operations of the complex machine 1, and is formed of a CPU or the like. The document reading portion 4, the document feeding portion 5, the operation portion 6, the image forming portion 21, the image processing portion 33, and the communication portion 34 operate under the control of the control portion 35. The control portion 35 not only controls the complex machine 1 systematically by performing processing according to the operation control program pre-installed in unillustrated ROM (Read Only Memory) or HDD (Hard Disk Drive) in response to various instruction signals inputted into the operation portion 6 by the user to output instruction signals or transfer data to the respective functional portions, but also operates as the respective functional portions as will be described below.

The control portion 35 also includes an ACS portion 36, a first encoding processing portion 37, a second encoding processing portion 38, a data volume comparing portion 39 (data volume estimating portion), a third encoding processing portion 40, a file creating portion 41, an error diffusion processing portion 42, and a decoding portion 43, all of which operate as functional portions relating to a filing operation in a case where image data obtained by a reading operation of the document reading portion 4 is filed and transmitted to a computer or the like connected to the complex machine 1. Regarding the second encoding processing portion 38 and the third encoding processing portion 40, the third encoding processing portion 40 will be described first for ease of description. Also, the respective functional portions of the control portion 35 may be achieved by a circuit, for example, an ASIC (Application Specific Integrated Circuit). In particular, it is preferable to configure in such a manner that the first encoding processing portion 37 and the error diffusion processing portion 42 as well as the first encoding portion 37 and the third encoding processing portion 40 are allowed to perform processing in parallel.

The ACS portion 36 determines whether an image of each page read by the document reading portion 4 is a monochrome (black and white) image or a color image. The ACS determination by the ACS portion 36 is performed, for example, as follows.

Initially, the ACS portion 36 determines whether pixels forming the image data read by the document reading portion 4 are color pixels or black and white pixels on a pixel-by-pixel basis. Because this determination method is a known method used to determine whether the respective pixels forming the image data are color pixels or black and white pixels on the basis of the RGB values of the image data, a chroma difference (color difference) between a target pixel for determination and the neighboring pixels, and the like, a detailed description is omitted herein. Upon determining that the target pixel is a color pixel by the determination described above, the ACS portion 36 counts up the number of color pixels for the document. When the counted number of color pixels reaches the pre-set threshold value, the ACS portion 36 determines the read image of the document as being a color image. Upon determining that the number of color pixels does not reach the threshold value by continuing to count on the assumption that all the rest of the pixels, which are target pixels to be determined as being a color pixel or a monochrome pixel, are color pixels, the ACS portion 36 determines the read image of the document as being a monochrome image at this point in time. It should be appreciated that the ACS determination processing as above is a mere example and the ACS determination by the ACS portion 36 is not limited to this processing.

When the ACS portion 36 determines the image as being a color image, the first encoding processing portion 37 performs the encoding processing by the JPEG compression method on the image data forming the color image. Also, when the ACS portion 36 determines the image as being a monochrome image, the first encoding processing portion 37 performs the encoding processing by the JPEG compression method on the image data forming the monochrome image. In short, the first encoding processing portion 37 encodes the data of an image read by the document reading portion 4 by the JPEG compression method independently of the determination result of the ACS portion 36.

When the ACS portion 36 determines the image as being a monochrome image, the third encoding processing portion 40 performs the encoding processing by the JBIG (Joint Bi-level Image experts Group) compression method on the image data forming the monochrome image, to be more specific, the image data on which the error diffusion processing has been performed by the error diffusion processing portion 42. The JBIG compression method is a binary image compression method in accordance with the ITU-T T.82|ISO/IEC11544 standard. In general, it has a higher compression ratio than the MMR compression method and a lower versatility than the MMR compression.

When the ACS portion 36 determines the image as being a monochrome image, the data volume comparing portion 39 compares a data volume of the image data after the encoding processing by the JPEG compression method by the first encoding processing portion 37 and a data volume of the image data after the encoding processing by the JBIG compression method by the third encoding processing portion 40 as to which data volume is larger than the other, and makes an estimation between a case of compressing the image data by the JPEG compression method and a case of compressing the image data by the MMR compression method as to in which case the data size becomes smaller.

When the data volume comparing portion 39 determines that a data volume of the image data after the encoding processing by the third encoding processing portion 40 is smaller than a data volume of the image data after the encoding processing by the first encoding processing portion 37, the second encoding processing portion 38 performs the encoding processing by the MMR compression method on the image data forming the monochrome image, to be more specific, the image data on which the error diffusion processing has been performed by the error diffusion processing portion 42.

The file creating portion 41 creates a file of the image data after the encoding processing by the first through third encoding processing portions 37 through 39.

To be more specific, in a case where the ACS portion 36 determines the image as being a monochrome image, when the data volume comparing portion 39 determines that a data volume of the image data after the encoding processing by the third encoding processing portion 40 is smaller than a data volume of the image data after the encoding processing by the first encoding processing portion 37, the second encoding processing portion 38 is controlled to perform the encoding processing by the MMR compression method on the image data. The file creating portion 41 then creates a file of the image data after this processing.

In a case where the ACS portion 36 determines the image as being a monochrome image, when the data volume comparing portion 39 determines that a data volume of the image data after the encoding processing by the JBIG compression method by the third encoding processing portion 40 is larger than a data volume of the image data after the encoding processing by the JPEG compression method by the first encoding processing portion 37, the file creating portion 41 creates a file of the image data after the encoding processing by the JPEG compression method by the first encoding processing portion 37.

By taking into account that the encoding processing by the MMR compression method has a lower compression ratio than the encoding processing by the JBIG compression method, when a data volume of the image data after the encoding processing by the JBIG compression method is larger than a data volume of the image data after the encoding processing by the JPEG compression method, it is estimated that a data volume of the image data after the encoding processing by he MMR compression method is also larger than a data volume of the image data by the encoding processing by the JPEG compression method.

Accordingly, in a case where a data volume of the image data after the encoding processing by the JBIG compression method becomes larger than a data volume of the image data after the encoding processing by the JPEG compression method, by creating a file of the image data after the encoding processing by the JPEG compression method, it becomes possible to reduce a possibility that a data volume of a monochrome image contrarily becomes larger than by compressing the image data by the JPEG compression method because the image data is compressed by the MMR compression method.

In a case where the data volume comparing portion 39 determines that a data volume of the image data after the encoding processing by the third encoding processing portion 40 is equal to a data volume of the image data after the encoding processing by the first encoding processing portion 37, the image data after the encoding processing by the first encoding processing portion 37 is filed in this embodiment.

Further, in a case where the ACS portion 36 determines the image as being a color image, the file creating portion 41 creates a file of the image data after the encoding processing by the first encoding processing (JPEG compression method).

The error diffusion processing portion 42 converts data of an image read by the document reading portion 4 into binary data by performing the error diffusion processing on the data. Accordingly, the smoothness of the density tones can be improved by the dither processing on the one hand while converting the image data into binary data on the other hand.

As the error diffusing processing, methods described, for example, in JP-A-2004-214812 and JP-A-2005-33369 can be adopted.

The decoding portion 43 decodes the image data encoded by the JBIG compression method by the third encoding processing portion 40 to restore the image data in a state where the error diffusion processing was performed thereon by the error diffusion processing portion 42, and outputs the restored data to the second encoding processing portion 38. The second encoding processing portion 38 then performs the encoding processing by the MMR compression method on the data outputted from the decoding portion 43 as the image data on which the error diffusion processing has been performed by the error diffusion processing portion 42.

Figure 3:
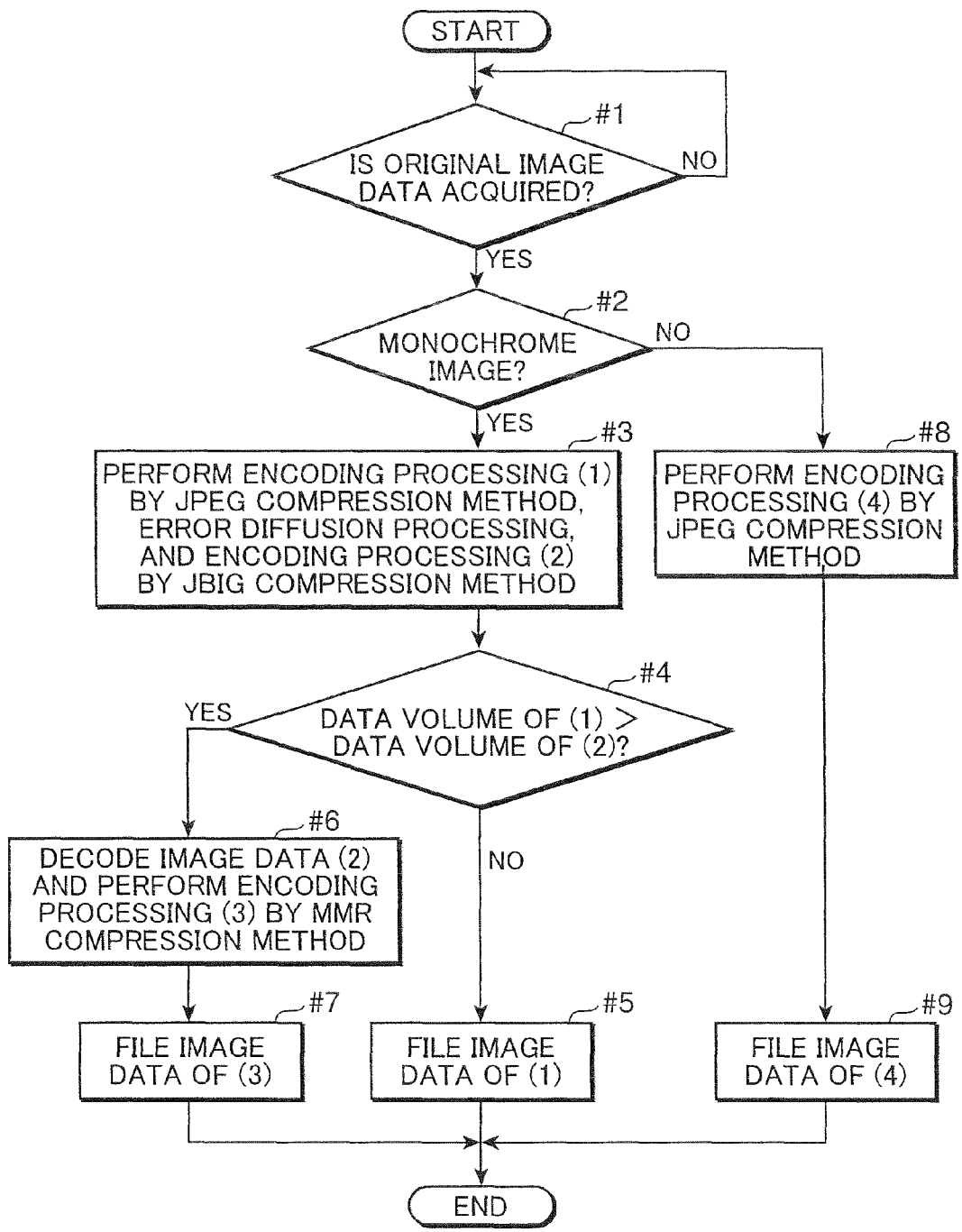
FIG. 3 is a view showing a flowchart detailing image processing by a control portion.

FIG. 3 is a view showing a flowchart of the image processing by the control portion 35.

As is shown in FIG. 3, upon acquisition of image data (original image data) obtained by a reading operation of the document reading portion 4 (YES in Step #1), the control portion 35 (the ACS portion 36) determines whether an image made up of the original image data is a monochrome image (Step #2). In a case where the control portion 35 (the ACS portion 36) determines the image as being a monochrome image (YES in Step #2), the first encoding processing portion 37 performs the encoding processing (1) by the JPEG compression method on the original image data, while at the same time the error diffusion processing portion 42 converts the original image data into binary data by performing the error diffusion processing, which is a known technique, on the original image data and the third encoding processing portion 40 performs the encoding processing (2) by the JBIG compression method on the image data after the error diffusion processing (Step #3).

It should be noted that the first encoding processing portion 37, and the error diffusion processing portion 42 and the third encoding processing portion 40 are configured to operate in parallel. Accordingly, because the encoding processing (1), and the error diffusion processing and the encoding processing (2) are performed in parallel, it becomes possible to shorten a time needed for the encoding processing by the JPEG compression method, the error diffusion processing, and the encoding processing by the JBIG compression method in Step #3.

Subsequently, the control portion 35 (the data volume comparing portion 39) determines whether a data volume of the image data obtained by the encoding processing (1) by the JPEG compression method is larger than a data volume of the image data obtained by the encoding processing (2) by the JBIG compression method (Step #4). Upon determination that the former is not larger than the latter, that is, a data volume of the image data obtained by the encoding processing (1) by the JPEG compression method is equal to or smaller than a data volume of the image data obtained by the encoding processing (2) by the JBIG compression method (NO in Step #4), the file creating portion 41 creates a file of the image data obtained by the encoding processing (1) by the JPEG compression method in Step #3 (Step #5).

Meanwhile, when the control portion 35 (the data volume comparing portion 39) determines that a volume of the image data obtained by the encoding processing (1) by the JPEG compression method is larger than a volume of the image data obtained by the encoding processing (2) by the JBIG compression method (YES in Step #4), the decoding portion 43 restores the image data after the error diffusion generated by the error diffusion processing portion 42 by decoding the image data obtained by the encoding processing (2) (Step #6).

The second encoding processing portion 38 then performs the encoding processing (3) by the MMR compression method on the image data after the error diffusion that has been restored as described above (Step #6). Subsequently, the file creating portion 41 creates a file of the image data after the encoding processing (3) (Step #7).

In a case where the control portion 35 (the ACS portion 36) determines the image obtained by the document reading portion 4 as being a color image in Step #2 (NO in Step #2), the first encoding processing portion 37 performs the encoding processing (4) by the JPEG compression method (Step #8), and the file creating portion 41 creates a file of the image data after the encoding processing (4) (Step #9).

As has been described, in a case where encoding processing is performed on the image data forming a monochrome image, the encoding processing by the MMR compression method is more suitable than the encoding processing by the JPEG compression method because a data volume is generally smaller. It is, however, configured in such a manner that when a data volume of the image data obtained by performing the encoding processing by the JBIG compression method is equal to or larger than a data volume of the image data obtained by performing the encoding processing by the JPEG compression method, that is, when it is estimated that a data volume of the image data becomes larger by compressing the image data by the MMR compression method than by the JPEG compression method, a file is created from the image data obtained by performing the encoding processing by the JPEG compression method. It thus becomes possible to make a volume of a file (file size) of the monochrome image smaller than by creating a file of the image data after the encoding processing by the MMR compression method.

Also, it is configured in such a manner that when a data volume of the image data obtained by performing the encoding processing by the JBIG compression method is smaller than a data volume of the image data obtained by the encoding processing by the JPEG compression method, a file is created from the image data obtained by performing the encoding processing by the MMR compression method. It thus becomes possible to perform appropriate encoding processing by adopting the encoding processing by the MMR compression method, which is suitable as the encoding processing in a case where encoding processing is performed on the image data forming a monochrome image.

It should be noted that both the image data obtained by the encoding processing (1) by the JPEG compression method and the image data obtained by the encoding processing (2) by the JBIG compression method in Step #3 have to be stored temporarily until the comparing processing in Step #4. Assume that the compression processing is performed as the encoding processing (2) not by the JBIG compression method but by the MMR compression method, then a compression ratio is lower than the case where the compression processing is performed by the JBIG compression method, which increases a memory region necessary to temporarily store the image data after the compression. The cost of the memory region used for temporarily storage, for example, a memory and an HDD, therefore increases.

Meanwhile, the complex machine 1 shown in FIG. 2 performs the encoding processing (2) by the JBIG compression method having a higher compression ratio than the MMR compression method in Step #3 and makes an estimation between the JPEG compression method and the MMR compression method as to by which method a data volume after the compression becomes smaller in Step #4 according to the compression result. Hence, in comparison with a case where the compression processing is performed by the encoding processing by the MMR compression method as the encoding processing (2) in Step #3, a memory region necessary for the temporarily storage is reduced. It thus becomes easier to reduce the cost of a memory region used for the temporarily storage, for example, a memory or an HDD.

Further, in a case where it is determined in Step #4 that a data volume after the compression becomes smaller by the JBIG compression method than by the JPEG compression method because the encoding processing (2) is performed by the JBIG compression method, assume that a file of the image data compressed by the JBIG compression method is created intact in Step #7 by skipping Step #6, convenience is reduced because the versatility is poor with the JBIG compression method in comparison with the MMR compression method.

In other words, even when the image data compressed by the JBIG compression method is transmitted to an external device connected via a network by the communication portion 34, it is highly likely that the external device is not able to decompress the image data compressed by the JBIG compression method.

However, by including the second encoding processing portion 38, the complex machine 1 shown in FIG. 2 is able to compress the image data by the MMR compression method having a higher versatility than the JBIG compression method (Step #6) and creates a file of the resulting data (Step #7) in a case where it is determined in Step #4 that a data volume after the compression becomes smaller by the JBIG compression method than by the JPEG compression method because the encoding processing (2) is performed by the JBIG compression method. It thus becomes possible to improve the convenience in comparison with a case where a data file by the JBIG compression method is created.

In other words, in a case where image data compressed by the MMR compression method is transmitted to an external device connected via a network by the communication portion 34, it is highly likely that the external device is able to decompress the image data in comparison with a case where the image data of the JBIG compression method is transmitted.

Assume that the decoding portion 43 is not provided, in order to perform the encoding processing (3) by the MMR compression method in Step #6, in addition to the image data obtained by the encoding processing (1) by the JPEG compression method and the image data obtained by the encoding processing (2) by the JBIG compression method, the image data after the error diffusion generated by the error diffusion processing portion 42 has to be stored temporarily in Step #3.

However, by including the decoding portion 43, the complex machine 1 shown in FIG. 2 can eliminate the need to temporarily store the image data after the error diffusion once the encoding processing (2) by the JBIG compression method is performed in Step #3. A memory region necessary for the temporarily storage can be thus reduced. It thus becomes easier to reduce the cost of the memory region used for the temporarily storage, for example, a memory and an HDD.

Alternatively, it may be configured in such a manner that the decoding portion 43 is omitted, and instead, the image data after the error diffusion (or the image data obtained by the document reading portion 4) is temporarily stored in a memory or the like in Step #3 and the second encoding processing portion 38 compresses the temporarily stored image data by the MMR compression method in Step #6.

Consequently, in a case where an image to be processed is a monochrome image, it becomes possible to make the file size smaller while avoiding or suppressing deterioration of the quality of the resulting image to the least extent possible.

Instead of or in addition to the embodiment above, modifications as follows are also adoptable.

(1) In the first embodiment above, in a case where the image obtained by a reading operation of the document reading portion 4 is a monochrome image, a subject to be compared with a data volume of the image data after the encoding processing by the JPEG compression method is set to a data volume of the image data per se after the encoding processing by the JBIG compression method. The subject, however, is not limited to the data volume, and the subject may be set, for example, to a value found by multiplying a data volume of the image data after the encoding processing by the JBIG compression method by a predetermined coefficient K.

For example, let A be a standard compression ratio of the MMR compression method and B be a standard compression ratio of the JBIG compression method, A/B can be used as such a coefficient K. Given K=A/B, then the value found by multiplying a data volume D of the image data obtained by the encoding processing (2) by the JBIG compression method by the coefficient K is closer to a data volume of the image data obtained by the encoding processing by the MMR compression method than the data volume D.

Hence, for example, in Step #4 shown in FIG. 3 and Step #15 shown in FIG. 6 described below, by comparing a data volume of the image data obtained by the encoding processing (1) by the JPEG compression method and a value found by multiplying a data volume of the image data obtained by the encoding processing (2) by the JBIG compression method by the coefficient K by the data volume comparing portion 39, it becomes possible to improve accuracy of an estimation between the JPEG compression method and the MMR compression method as to by which method a data volume after the compression becomes smaller.

Alternatively, the third encoding processing portion 40 may be omitted so as not to generate the intermediate image data, such as the image data after the encoding processing by the JBIG compression method, and instead, for example, as is shown in FIG. 7, image data after the encoding processing by the MMR compression method may be generated directly from the image data after the error diffusion, so that a data volume of this image data is used as a subject to be compared.

In the processing shown in FIG. 7, when the control portion 35 acquires the image data (original image data) obtained by a reading operation of the document reading portion 4 (YES in Step #31), the ACS portion 36 determines whether the image made up of the original image data is a monochrome image (Step #32). In a case where the control portion 35 (the ACS portion 36) determines the image as being a monochrome image (YES in Step #32), the first encoding processing portion 37 performs the encoding processing by the JPEG compression method on the original image data, while at the same time the error diffusion processing portion 42 converts the original image data into binary data by performing the error diffusion processing, which is a known technique, on the original image data and the second encoding processing portion 38 further performs the encoding processing by the MMR compression method on the image data after the error diffusion processing (Step #33).

It should be noted that first encoding processing portion 37, and the error diffusion processing portion 42 and the second encoding processing portion 38 are configured to operate in parallel. Accordingly, because the encoding processing (1), and the error diffusion processing and the encoding processing (2) are performed in parallel, it becomes possible to shorten a time needed for the encoding processing by the JPEG compression method, the error diffusion processing, and the encoding processing by the MMR compression method in Step #33.

Subsequently, the control portion 35 (data volume comparing portion 39) determines whether a data volume of the image data obtained by the encoding processing (1) by the JPEG compression method in Step #33 is larger than a data volume of the image data obtained by the encoding processing (2) by the MMR compression method in Step #33 (Step #34). When the data volume comparing portion 39 determines that the former is not larger than the latter, that is, a data volume of the image data obtained by the encoding processing (1) by the JPEG compression method is equal to or smaller than a data volume of the image data obtained by the encoding processing (2) by the MMR compression method (NO in Step #34), the file creating portion 41 creates a file of the image data obtained by the encoding processing (1) by the JPEG compression method in Step #33 (Step #35).

Meanwhile, when the control portion 35 (the data volume comparing portion 39) determines that a data volume of the image data obtained by the encoding processing (1) by the JPEG compression method in Step #33 is larger than a data volume of the image data obtained by the encoding processing (2) by the MMR compression method in Step #33 (YES in Step #34), the file creating portion 41 creates a file of the image data after the encoding processing (2) by the MMR compression method (Step #36).

In a case where the control portion 35 (the ACS portion 36) determines the image obtained by the document reading portion 4 as being a color image in Step #32 (NO in Step #32), the first encoding processing portion 37 performs the encoding processing (3) by the JPEG compression method (Step #37), and the file creating portion 41 creates a file of the image data after the encoding processing (3) (Step #38).

It should be noted, however, that in the first embodiment above, because the encoding processing by the JBIG compression method has a lower versatility and a higher compression ratio than the encoding processing by the MMR compression method, the encoding processing by the JBIG compression method is performed on the image data after the error diffusion processing first and thence the comparing processing is performed, so that in a case where a data volume of the image data after this encoding processing is smaller than a data volume of the image data after the encoding processing by the JPEG compression method, the encoding processing by the MMR compression method is performed and a file of the image data after this processing is created. Hence, in comparison with the configuration as described above in which the image data after the encoding processing by the MMR compression method is generated directly from the image data after the error diffusion processing to use a data volume of this image data as the subject to be compared, it becomes possible to set subjects of various types of processing including the comparing processing to image data of a smaller size. Hence, not only can a time needed for the various types of processing and a load be reduced, but also various types of image processing can be applied to the image data in the file in many more external devices in the case of a configuration in which a file created by the complex machine 1 is transmitted to an external device, such as a personal commuter.

Further, in Step #3 shown in FIG. 3, it may be configured in such a manner that the third encoding processing portion 40 generates image data by the encoding processing (2) by another compression method (for example, the MR (Modified Read) compression method), so that the data volume comparing portion 39 uses a data volume of the image data compressed by the encoding processing (2) by the MR method as the subject to be compared in Step #4.

(2) In the first embodiment or the modification (1) above, image data to be filed is determined automatically. However, in addition to this capability, the complex machine 1 may be furnished with a capability of enabling the user to input the settings as to image data to be filed or the type of encoding processing by which the image data is generated.

Figure 4:
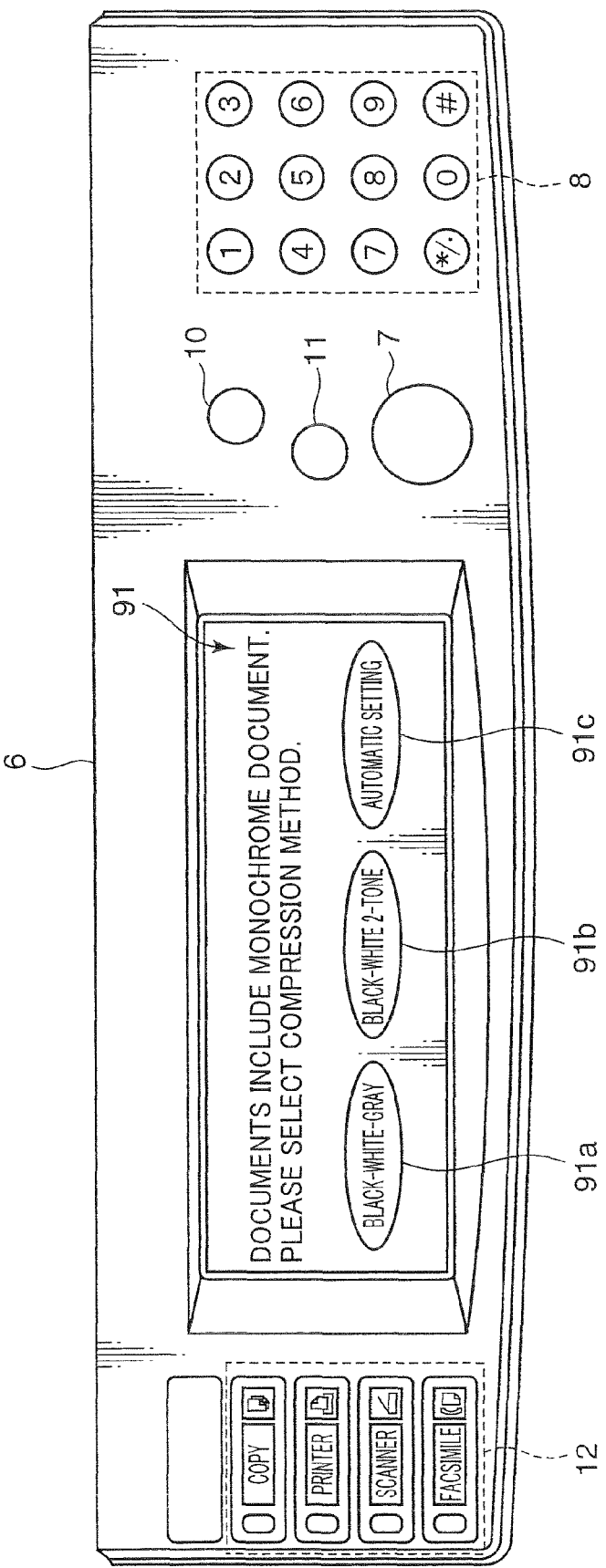
FIG. 4 is a view showing an example of an input screen for the user to input the setting as to the type of encoding processing for generating image data to be filed.

More specifically, upon acquisition of the original image data, the control portion 35 controls an input screen, for example, as is shown in FIG. 4, to be displayed on the display portion 9. The input screen displays a message informing that a monochrome document is included in a pile of documents as well as a black-white-gray button 91a, a black-white 2-tone button 91b, and an automatic setting button 91c. When the black-white-gray button 91a is selected, the encoding processing by the JPEG compression method is performed on the image data of a monochrome document and a file of the image data after this processing is created. When the black-white 2-tone button 91b is selected, the encoding processing by the MMR compression method is performed on the image data of a monochrome document and a file of the image data after this processing is created. When the automatic setting button 91c is selected, encoding processing by the compression method determined by the complex machine 1 according to the determination method in the first embodiment above is performed on the image data of a monochrome document and a file of the image data after this processing is created.

As has been described, by being furnished further with the capability of enabling the user to input the settings as to the image data to be filed or the type of encoding processing by which the image data is generated, it becomes possible to use the capability of automatically setting the compression method and the capability of enabling the user to determine the compression method as the user wishes. A highly convenient complex machine can be thus achieved.

Figure 5:
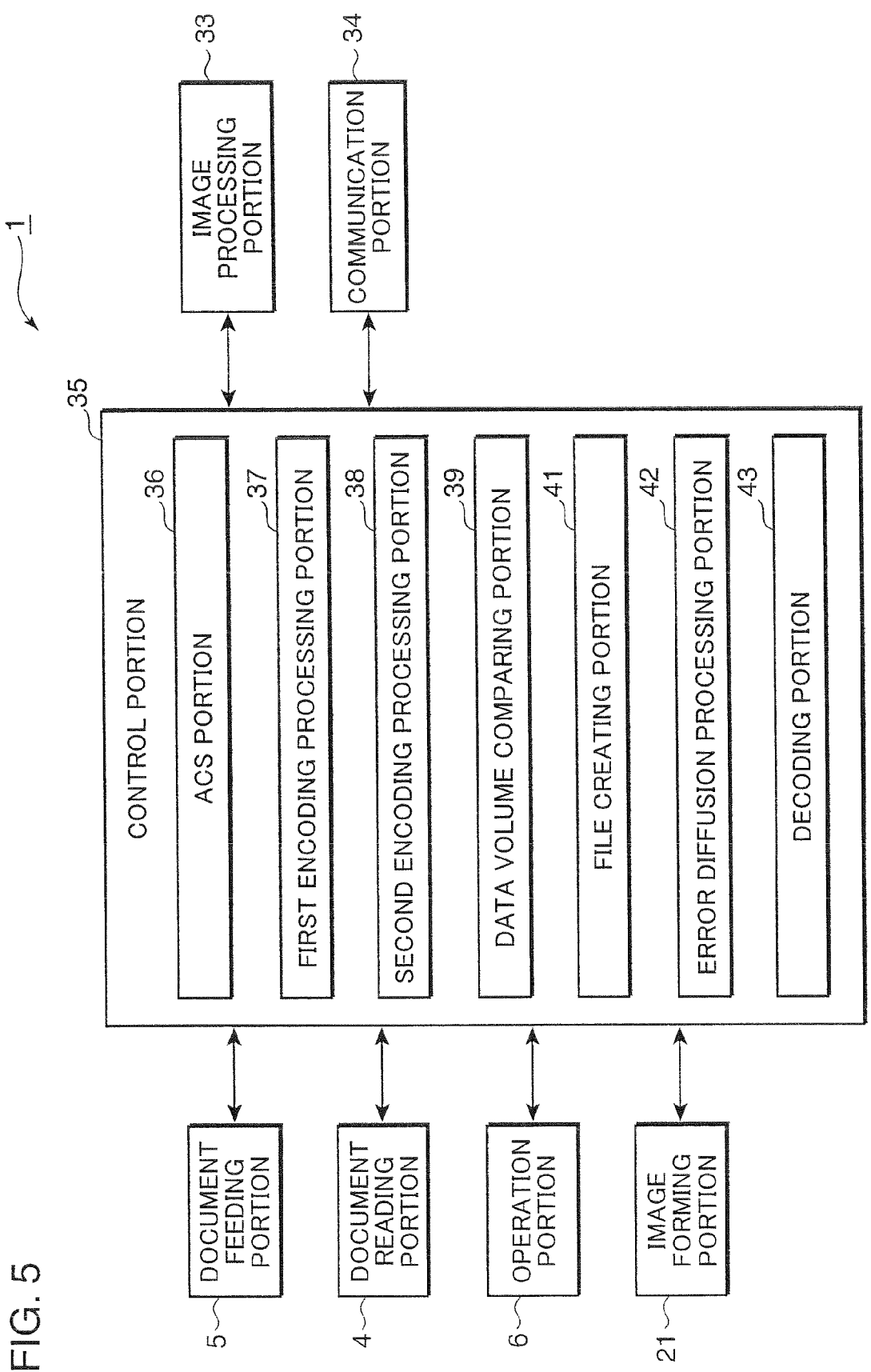
FIG. 5 is a block diagram showing the electrical configuration of a modification of the complex machine.

(3) In the embodiment above, the encoding processing by the JPEG compression method is performed by the first encoding processing portion 37 and the encoding processing by the JBIG compression method is performed by the third encoding processing portion 39. However, as is shown in FIG. 5, in a case where it is configured in such a manner that these types of encoding processing are performed by a single encoding processing portion (hereinafter, this encoding processing portion is referred to as the first encoding processing portion 37' of this embodiment), the image processing by the control portion 35 is performed as are detailed in FIG. 6 and FIG. 8.

Figure 6:
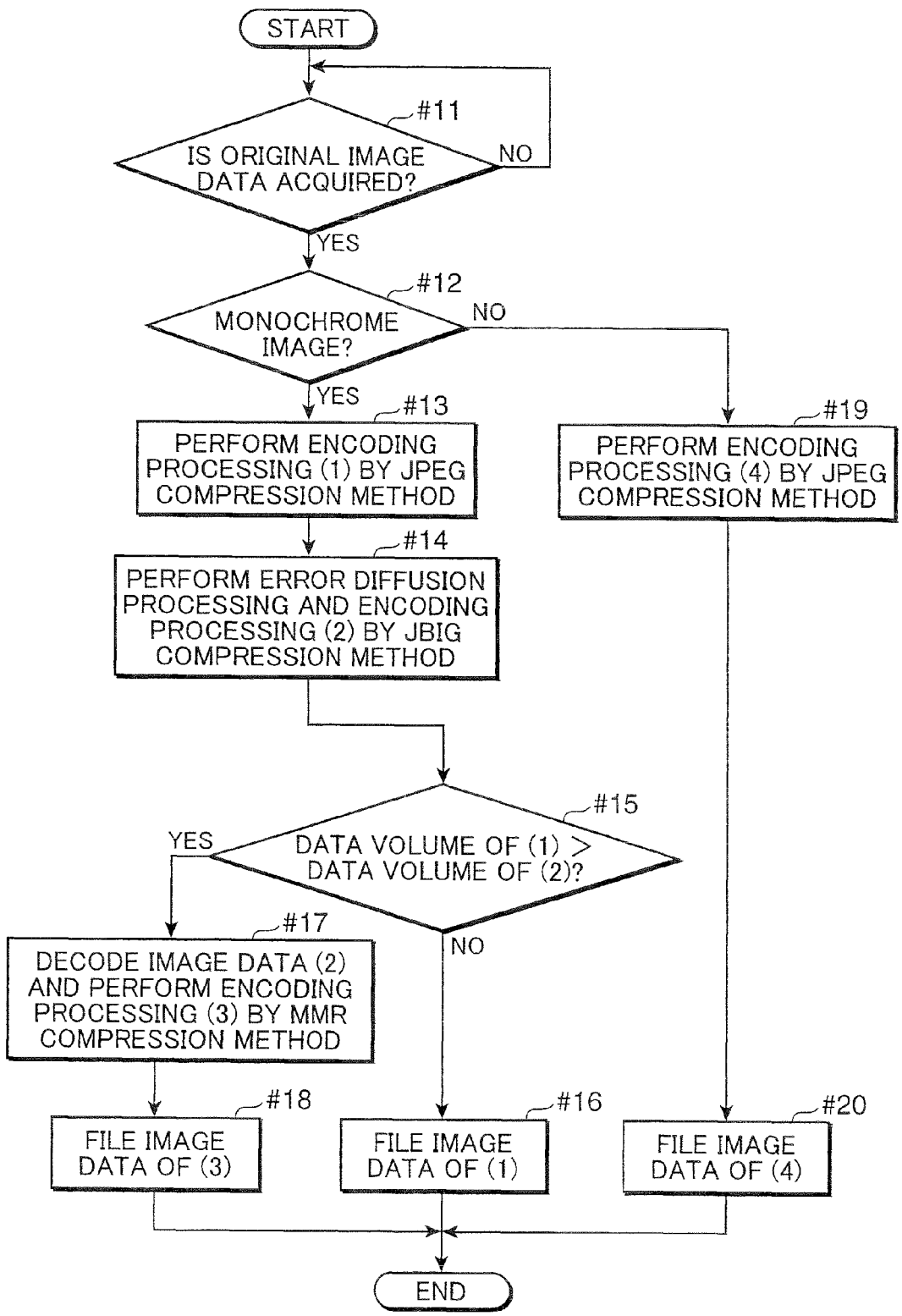
FIG. 6 is a view showing a flowchart of image processing by the control portion in the modification.

As is shown in FIG. 6, upon acquisition of the image data (original image data) obtained by a reading operation of the document reading portion 4 (YES in Step #11), the control portion 35 determines whether the image made up of the original image data is a monochrome image (Step #12). In a case where the control portion 35 determines the image as being a monochrome image (YES in Step #12), it performs encoding processing by the JPEG compression method on the original image data (Step #13). Also, the control portion 35 converts the original image data into binary data by performing the error diffusion processing, which is a known technique, and performs the encoding processing by the JBIG compression method on the image data after the error diffusion processing (Step #14). Processing in Steps #15 through #20 are almost the same as the processing in Step #4 through #9 detailed in the flowchart of FIG. 3, and descriptions of these steps are omitted herein.

The processing shown in FIG. 8 is the processing to generate image data after the encoding processing by the MMR compression method directly from the image data after the error diffusion processing without generating intermediate image data like the image data after the encoding processing by the JBIG compression method as in the processing shown in FIG. 6, so that a data volume of the image data thus generated is used as the subject to be compared. As is shown in FIG. 8, the control portion 35 performs processing in Steps #41 through #43 almost in the same manner as in Steps #11 through #13 detailed in the flowchart of FIG. 6, and performs the binary coded processing by means of the error diffusion processing, which is a known technique, as well as the encoding processing by the MMR compression method on the image data after the error diffusion processing (Step #44).

The control portion 35 compares a data volume of the image data obtained by the encoding processing by the JPEG compression method in Step #43 and a data volume of the image data obtained by the encoding processing by the MMR compression method in Step #44 as to which data volume is larger than the other (Step #45). In a case where the control portion 35 determines that a data volume of the image data obtained by the encoding processing by the JPEG compression method in Step #43 is equal to or smaller than a data volume of the image data obtained by the encoding processing by the MMR compression method in Step #44 (NO in Step #45), the image data obtained by the encoding processing by the JPEG compression method in Step #43 is filed (Step #46).

Meanwhile, in a case where the control portion 35 determines that a data volume of the image data obtained by the encoding processing by the JPEG compression method in Step #43 is larger than a data volume of the image data obtained by the encoding processing by the MMR compression method in Step #44 (YES in Step #45), the image data obtained by the encoding processing by the MMR compression method is filed (Step #47).

In a case where the control portion 35 determines the image obtained in Step #41 as being a color image (NO in Step #42), it performs processing in Steps #48 and #49 almost in the same manner as in Steps #19 and 20 detailed in the flowchart of FIG. 6.

(4) By configuring in such a manner that the encoding processing by the JPEG compression method and the encoding processing by the JBIG compression method are performed using the same ASIC, the number of ASICs can be reduced in comparison with the configuration in which each encoding processing is performed by a different ASIC. It thus becomes possible to reduce the device both in cost and size.

(5) The first embodiment above has been described using the JPEG compression method as the compression method used for compressing multilevel image data exceeding binary data and the JBIG compression method and the MMR compression method as the compression method used for compressing binary image data byway of example. It should be appreciated, however, that the compression methods are not limited to those specified above and other compression methods can be adopted as well.

(6) Applications of the invention are not limited to a complex machine and the invention is also applicable to other types of image reading device, such as a scanner.

(7) The error diffusion processing is not necessarily performed in Steps #3, #14, #33, and #44, and it may be configured in such a manner that a binary coded processing portion that performs the binary coded processing alone is provided instead of the error diffusion processing portion 42. Accordingly, it may be configured in such a manner that the third encoding processing portion 40 performs the encoding processing (2) by the JBIG compression method on the binary image data converted by the binary coded processing portion in Steps #3 and #14 while the second encoding processing portion 38 performs the encoding processing (2) by the MMR compression method on the binary image data converted by the binary coded processing portion in Steps #33 and #44.

An image processing device according to an aspect of the invention includes: a first encoding processing portion configured to perform first encoding processing according to a first compression method for compressing multilevel image data; a second encoding processing portion configured to perform second encoding processing according to a second compression method for compressing binary image data; a determination portion configured to determine whether an image made up of acquired image data is a monochrome image; a data volume estimating portion configured to make an estimation, in a case where the determination portion determines the image as being the monochrome image, between a first data volume as a data volume when image data forming the monochrome image is compressed by the first encoding processing and a second data volume as a data volume when the image data is compressed by the second encoding processing as to which data volume becomes smaller; and a file creating portion configured to create a data file from image data of the monochrome image after the first encoding processing by the first encoding processing portion when the data volume estimating portion makes an estimation that the first data volume is smaller than the second data volume and creates a data file from image data of the monochrome image after the second encoding processing by the second encoding processing portion when the data volume estimating portion makes an estimation that the second data volume is smaller than the first data volume.

In a case where the encoding processing is performed on image data forming a monochrome image, the second encoding processing for compressing binary image data indicating the density of an image by two values is basically more suitable than the first encoding processing for compressing multilevel image data indicating the density of an image by multiple values. However, for example, when halftones are included in large parts, a data volume may become larger by compressing a binary image by the second encoding processing than by the first encoding processing in some cases. Nevertheless, even in such a case, according to the configuration above, when it is estimated that a data volume of the image data after the first encoding processing is smaller than a data volume of the image data after the second encoding processing, a data file is created from the image data after the first encoding processing. It thus becomes possible to make a volume of a file (file size) of the monochrome image smaller than in a case where a data file is created from the image data after the second encoding processing.

Meanwhile, in a case where it is estimated that a data volume of the image data after the second encoding processing is smaller than a data volume of the image data after the first encoding processing, the second encoding processing is adopted, which is suitable as the encoding processing when encoding processing is performed on image data forming a monochrome image.

Consequently, in a case where an image subject to compression processing is a monochrome image, it becomes possible to make a size of a data file (volume of the file) after the compression smaller independently of the content of an image.

Also, it is preferable that: the first encoding processing portion performs the first encoding processing on the image data forming the monochrome image when the determination portion determines the image as being the monochrome image; the second encoding processing portion performs the second encoding processing on the image data forming the monochrome image when the determination portion determines the image as being the monochrome image; the data volume estimating portion includes a data volume comparing portion configured to perform comparing processing to compare the first data volume and the second data volume as to which data volume is larger than the other; and the data volume comparing portion included the data volume estimating portion makes the estimation when the determination portion determines the image as being the monochrome image by comparing the first data volume of the image data compressed by the first encoding processing portion and the second data volume of the image data compressed by the second encoding processing portion.

According to this configuration, the data volume estimating portion becomes able to make an estimation between a case of compressing the image data by the first encoding processing and a case of compressing the image data by the second encoding processing as to in which case a data volume becomes smaller on the basis of a data volume after compression obtained by actually performing the first encoding processing and the second encoding processing. It is therefore possible to make an estimation at a higher degree of accuracy.

Also, it is preferable to further include an error diffusion processing portion configured to perform error diffusion processing on the image data of the monochrome image, so that the second encoding processing portion performs the second encoding processing on the image data on which the error diffusion processing has been performed by the error diffusion processing portion when the determination portion determines the image as being the monochrome image.

According to this configuration, when binary image data is compressed by the second encoding processing portion, the error diffusion processing is performed on the image data by the error diffusion processing portion. It thus becomes possible to improve the smoothness of the density tones of a binary image by the dither processing.

Also, it is preferable that when the determination portion determines the image as being the monochrome image, the first encoding processing by the first encoding processing portion and the second encoding processing by the second encoding processing portion are performed in parallel.

According to this configuration, it becomes possible to shorten a time needed for the first and second encoding processing.

Also, it is preferable to further include a third encoding processing portion configured to perform third encoding processing according to a third compression method for compressing binary image data at a higher compression ratio than the second compression method, so that: the first encoding processing portion performs the first encoding processing on the image data forming the monochrome image when the determination portion determines the image as being the monochrome image; the third encoding processing portion performs the third encoding processing on the image data forming the monochrome image when the determination portion determines the image as being the monochrome image; the data volume estimating portion includes a data volume comparing portion configured to perform comparing processing to compare a third data volume on the basis of a data volume when the image data forming the monochrome image is compressed by the third encoding processing and the first data volume as to which data volume is larger than the other; and the data volume comparing portion included the data volume estimating portion compares the first data volume of the image data compressed by the first encoding processing portion and the third data volume of the image data compressed by the third encoding processing portion when the determination portion determines the image as being the monochrome image and makes an estimation that the first data volume is smaller than the second data volume when the first data volume is smaller than the third data volume and an estimation that the second data volume is smaller than the first data volume when the third data volume is smaller than the first data volume.

According to this configuration, when the determination portion determines the image as being a monochrome image, the image data determined as forming a monochrome image is compressed by the third encoding processing having a higher compression ratio than the second encoding processing. Accordingly, because a data volume after the compression obtained by the third encoding processing is smaller than a data volume when the image data is compressed by the second encoding processing, the data volume comparing portion is able to make an estimation that the first data volume is smaller than the second data volume when the first data volume is smaller than the third data volume. Meanwhile, the data volume comparing portion is able to make a rough estimation that the second data volume is smaller than the first data volume when the third data volume is smaller than the first data volume.

In this instance, for the data volume comparing portion to compare the first and third data volumes, it is necessary to secure a storage region in which to temporarily store data after the compression obtained by the first encoding processing and data after the compression obtained by the third encoding processing. Accordingly, because a data volume after the compression obtained by the third encoding processing is smaller than a data volume in a case where the image data is compressed by the second encoding processing, the storage region for temporarily storing the data can be reduced in comparison with a case where the data volume comparing portion is configured so as to compare the first and second data volumes.

Also, it is preferable that the data volume comparing portion uses, as the third data volume, a value found by multiplying the data volume of the image data forming the monochrome image when compressed by the third encoding processing by a ratio of a compression ratio of the second compression method with respect to a compression ratio of the third compression method.

When a value found by multiplying a data volume when the image data forming a monochrome image is compressed by the third encoding processing by a ratio of the compression ratio of the second compression method with respect to the compression ratio of the third compression method is used as the third volume data, the third data volume can be closer to the second data volume than in a case where a data volume when the image data is compressed by the third encoding processing is used intact as the third data volume. It is therefore possible to improve accuracy of an estimation as to which of the first data volume and the second data volume is smaller on the basis of the third data volume.

Also, it is preferable to further include a decoding portion configured to decode the image data compressed by the third encoding processing by the third encoding processing portion when the data volume comparing portion included the data volume estimating portion makes the estimation that the second data volume is smaller than the first data volume, so that the second encoding processing portion compresses the image data decoded by the decoding portion by the second encoding processing.

According to this configuration, in a case where the data volume comparing portion determines that the third data volume is smaller than the first data volume, the image data compressed by the third encoding processing is decompressed by the decoding portion. The image data thus decompressed is compressed by the second encoding processing by the second encoding processing portion. The file creating portion then creates a data file from the image data compressed by the second encoding processing. Assume that the decoding portion is not provided, then, it is necessary to store the image data before the compression intact for the second encoding processing by the second encoding processing portion even after the image data of a monochrome image is compressed by the third encoding processing. However, according to the configuration above, the image data compressed by the third encoding processing is decompressed by the decoding portion and the image data thus decompressed is compressed by the second encoding processing by the second encoding processing portion. The need to store the image data before the compression by the third encoding processing can be eliminated, which makes it possible to reduce the storage region in comparison with a case where the decoding portion is not provided.

Also, it is preferable to further include an error diffusion processing portion configured to perform error diffusion processing on the image data of the monochrome image, so that: the third encoding processing portion performs the third encoding processing on the image data on which the error diffusion processing has been performed by the error diffusion processing portion when the determination portion determines the image as being the monochrome image; and the file creating portion creates a data file from image data obtained as the second encoding processing portion performs the second encoding processing on the image data on which the error diffusion processing has been performed when the data volume estimating portion makes the estimation that the second data volume is smaller than the first data volume.

According to this configuration, when the data volume estimating portion makes an estimation that the second data volume is smaller than the first data volume, a data file is created from the image data compressed by performing the second encoding processing on the image data on which the error diffusion processing has been performed. It is therefore possible to improve the smoothness of the density tones of the binary image saved to the data file.

Also, it is preferable to further include an error diffusion processing portion configured to perform error diffusion processing on the image data of the monochrome image, so that: the third encoding processing portion performs the third encoding processing on the image data on which the error diffusion processing has been performed by the error diffusion processing portion when the determination portion determines the image as being the monochrome image; and the decoding portion restores the image data on which the error diffusion processing has been performed by the error diffusion processing portion by decoding the image data compressed by the third encoding processing by the third encoding processing portion in a case where the data volume comparing portion included the data volume estimating portion makes the estimation that the second data volume is smaller than the first data volume.

According to this configuration, the image data decompressed as it is decoded by the decoding portion is rendered as the image data before the third encoding processing is performed, that is, the image data on which the error diffusion processing has been performed. Then, the image data on which the error diffusion processing has been performed is compressed by the second encoding processing by the second encoding processing portion and a data file is created from the resulting image data. It is therefore possible to further improve the smoothness of the density tones of the binary image saved to the data file.

Also, it is preferable that the first encoding processing by the first encoding processing portion and the third encoding processing by the third encoding processing portion are performed in parallel when the determination portion determines the image as being the monochrome image.

According to this configuration, it becomes possible to shorten a time needed for the first and third encoding processing.

Also, it is preferable that the file creating portion creates a data file from image data of a color image after the first encoding processing by the first encoding processing portion when the determination portion determines the image as being the color image.

According to this configuration, when the determination portion determines the image as being a color image, the first encoding processing portion compresses the color image by the first compression method, which is the compression method for multilevel image data suitable to a color image, and a data file is created from the resulting image data. It is therefore possible to improve the image quality of the data file.

Also, it is preferable that the first compression method is a JPEG compression method and the second compression method is an MMR compression method.

Because the JPEG compression method is a compression method for a multilevel image, it is suitable as the first compression method. Also, because the MMR compression method is a compression method for a binary image, it is suitable as the second compression method.

Also, it may be configured in such a manner that the first encoding processing portion and the second encoding processing portion are achieved by using a same ASIC and the ASIC performs the first encoding processing and the second encoding processing sequentially to output the image data after the first encoding processing and the image data after the second encoding processing to the data volume comparing portion in one of sequential and simultaneous manners.

According to this configuration, the first encoding processing portion and the second encoding processing portion are achieved by using the same ASIC.

Also, it is preferable that the first compression method is a JPEG compression method, the second compression method is an MMR compression method, and the third compression method is a JBIG compression method.

Because the JPEG compression method is a compression method for a multilevel image, it is suitable as the first compression method. Also, because the MMR compression method is a compression method for a binary image, it is suitable as the second compression method. In addition, because the JBIG compression method has a higher compression ratio than the MMR compression method, it is suitable as the third compression method. Data of the JBIG compression method having a lower versatility than the JPEG compression method and the MMR compression method is not used as a data file, and a data file is created from the image data compressed by the JPEG compression method and the MMR compression method having a higher versatility than the JBIG compression method. Consequently, the convenience is enhanced.

Also, it is preferable that the first encoding processing portion and the third encoding processing portion are achieved by using a same ASIC and the ASIC performs the first encoding processing and the third encoding processing sequentially to output the image data after the first encoding processing and the image data after the third encoding processing to the data volume comparing portion in one of sequential and simultaneous manners.

According to this configuration, the first encoding processing portion and the third encoding processing portion are achieved by using the same ASIC.

Also, it is preferable to further include an input operation portion configured to enable an input to select one of the image data after the first encoding processing by the first encoding processing portion and the image data after the second encoding processing by the second encoding processing portion as image data from which the data file is to be created when the determination portion determines the image as being the monochrome image, so that the file creating portion creates the data file from the image data selected by the input operation portion independently of an estimation result of the data volume estimating portion upon acceptance of a selection of the image data at the input operation portion.

According to this configuration, it is possible to create a data file compressed by the compression method as the user desires independently of an estimation result of the data volume estimating portion.

Also, it is preferable that processing performed by the determination portion is ACS processing.

According to this configuration, whether the image is a monochrome image or not is determined automatically by the ACS processing.

Also, an image reading device according to another aspect of the invention includes an image reading portion configured to read an image of a document and the image processing device as described above. The image processing device acquires image data obtained by a reading operation of the image reading portion as the image data.

According to this configuration, in a case where an image of a document read by the image reading portion is a monochrome image, it becomes possible to reduce the size of a data file after compression smaller independently of the content of an image.

This application is based on Japanese Patent application serial No. 2007-333137 filed in Japan Patent Office on Dec. 25, 2007, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image processing device, comprising:
a first encoding processing portion configured to perform first encoding processing according to a first compression method for compressing multilevel image data;
a second encoding processing portion configured to perform second encoding processing according to a second compression method for compressing binary image data;
a third encoding processing portion configured to perform third encoding processing according to a third compression method for compressing binary image data at a higher compression ratio than the second compression method;
a determination portion configured to determine whether an image made up of acquired image data is a monochrome image;
a data volume estimating portion configured to make an estimation, in a case where the determination portion determines the image as being the monochrome image, between a first data volume as a data volume when image data forming the monochrome image is compressed by the first encoding processing and a second data volume as a data volume when the image data is compressed by the second encoding processing as to which data volume becomes smaller; and
a file creating portion configured to create a data file from image data of the monochrome image after the first encoding processing by the first encoding processing portion when the data volume estimating portion makes an estimation that the first data volume is smaller than the second data volume and creates a data file from image data of the monochrome image after the second encoding processing by the second encoding processing portion when the data volume estimating portion makes an estimation that the second data volume is smaller than the first data volume, wherein
the first encoding processing portion performs the first encoding processing on the image data forming the monochrome image when the determination portion determines the image as being the monochrome image;
the third encoding processing portion performs the third encoding processing on the image data forming the monochrome image when the determination portion determines the image as being the monochrome image;
the data volume estimating portion includes a data volume comparing portion configured to perform comparing processing to compare a third data volume on the basis of a data volume when the image data forming the monochrome image is compressed by the third encoding processing and the first data volume as to which data volume is larger than the other; and
the data volume comparing portion included the data volume estimating portion compares the first data volume of the image data compressed by the first encoding processing portion and the third data volume of the image data compressed by the third encoding processing portion when the determination portion determines the image as being the monochrome image and makes an estimation that the first data volume is smaller than the second data volume when the first data volume is smaller than the third data volume and an estimation that the second data volume is smaller than the first data volume when the third data volume is smaller than the first data volume.

2. The image processing device according to claim 1, wherein:
the data volume comparing portion uses, as the third data volume, a value found by multiplying the data volume of the image data forming the monochrome image when compressed by the third encoding processing by a ratio of a compression ratio of the second compression method with respect to a compression ratio of the third compression method.

3. The image processing device according to claim 1, further comprising:
a decoding portion configured to decode the image data compressed by the third encoding processing by the third encoding processing portion when the data volume comparing portion included the data volume estimating portion makes the estimation that the second data volume is smaller than the first data volume,
wherein the second encoding processing portion compresses the image data decoded by the decoding portion by the second encoding processing.

4. The image processing device according to claim 1, further comprising:
an error diffusion processing portion configured to perform error diffusion processing on the image data of the monochrome image,
wherein:
the third encoding processing portion performs the third encoding processing on the image data on which the error diffusion processing has been performed by the error diffusion processing portion when the determination portion determines the image as being the monochrome image; and
the file creating portion creates a data file from image data obtained as the second encoding processing portion performs the second encoding processing on the image data on which the error diffusion processing has been performed when the data volume estimating portion makes the estimation that the second data volume is smaller than the first data volume.

5. The image processing device according to claim 3, further comprising:

an error diffusion processing portion configured to perform error diffusion processing on the image data of the monochrome image, wherein:

the third encoding processing portion performs the third encoding processing on the image data on which the error diffusion processing has been performed by the error diffusion processing portion when the determination portion determines the image as being the monochrome image; and the decoding portion restores the image data on which the error diffusion processing has been performed by the error diffusion processing portion by decoding the image data compressed by the third encoding processing by the third encoding processing portion in a case where the data volume comparing portion included the data volume estimating portion makes the estimation that the second data volume is smaller than the first data volume.

6. The image processing device according to claim 1, wherein:

the first encoding processing by the first encoding processing portion and the third encoding processing by the third encoding processing portion are performed in parallel when the determination portion determines the image as being the monochrome image.

7. The image processing device according to claim 1, wherein:

the file creating portion creates a data file from image data of a color image after the first encoding processing by the first encoding processing portion when the determination portion determines the image as being the color image.

8. The image processing device according to claim 1, wherein:

the first compression method is a JPEG compression method and the second compression method is an MMR compression method.

9. The image processing device according to claim 1, wherein:

the first compression method is a JPEG compression method, the second compression method is an MMR compression method, and the third compression method is a JBIG compression method.

10. The image processing device according to claim 1, wherein:

the first encoding processing portion and the third encoding processing portion are achieved by using a same ASIC and the ASIC performs the first encoding processing and the third encoding processing sequentially to output the image data after the first encoding processing and the image data after the third encoding processing to the data volume comparing portion in one of sequential and simultaneous manners.

11. The image processing device according to claim 1, further comprising:

an input operation portion configured to enable an input to select one of the image data after the first encoding processing by the first encoding processing portion and the image data after the second encoding processing by the second encoding processing portion as image data from which the data file is to be created when the determination portion determines the image as being the monochrome image, wherein the file creating portion creates the data file from the image data selected by the input operation portion independently of an estimation result of the data volume estimating portion upon acceptance of a selection of the image data at the input operation portion.

12. The image processing device according to claim 1, wherein:

processing performed by the determination portion is ACS processing.

13. An image reading device, comprising:

an image reading portion configured to read an image of a document; and the image processing device set forth in claim 1, wherein the image processing device acquires image data obtained by a reading operation of the image reading portion as the image data.

* * * * *